United States Patent [19]
Onken

[11] Patent Number: 5,908,551
[45] Date of Patent: Jun. 1, 1999

[54] GREASE CADDIE

[75] Inventor: Donald R. Onken, Easton, Ill.

[73] Assignee: Onken's Inc., Easton, Ill.

[21] Appl. No.: 09/021,447

[22] Filed: Feb. 10, 1998

[51] Int. Cl.[6] .......................... B01D 35/027; B01D 35/34; B01D 35/18; A47J 37/12

[52] U.S. Cl. .................... 210/184; 210/241; 210/DIG. 8; 210/474; 99/408; 141/82; 141/98; 392/322; 392/347; 392/441; 392/444; 392/445

[58] Field of Search ...................................... 210/184, 241, 210/DIG. 8, 474, 167; 141/82, 98; 392/322, 347, 441, 444, 445; 99/408

[56] References Cited

U.S. PATENT DOCUMENTS

| | | |
|---|---|---|
| 1,554,589 | 9/1925 | Long . |
| 3,294,039 | 12/1966 | Ogden . |
| 3,432,642 | 3/1969 | Lohr . |
| 4,360,046 | 11/1982 | Streit . |
| 4,420,006 | 12/1983 | Moore . |
| 4,444,095 | 4/1984 | Anetsberger . |
| 4,646,793 | 3/1987 | Sherratt . |
| 4,890,548 | 1/1990 | Grob . |
| 5,247,876 | 9/1993 | Wilson . |
| 5,340,471 | 8/1994 | Wilson . |
| 5,609,193 | 3/1997 | Steckler . |
| 5,823,097 | 10/1998 | Dirck . |
| 5,850,503 | 12/1998 | Onken . |

Primary Examiner—Thomas M. Lithgow
Attorney, Agent, or Firm—Edwin E. Greigg; Ronald E. Greigg

[57] ABSTRACT

A mobile cooking oil caddie which includes in combination features of heating, filtering and transporting oil for disposal into a disposal tank. The caddie is rolled under a hot oil fry cooker and hot fats can be drained into the caddie from the cooker. A filter screen is provided in the caddie for filtering the hot fats. If the grease is to be disposed, the caddie is moved to a facility in which the oil is pumped from the caddie by a motorized pump to a disposal tank. If the grease has been stored for a time and is not in a fluid state, the heater can be activated to heat transfer mixture which in turn heats the grease to a fluid state. The filter can then be cleaned of food particles and the caddie stored until it is desired to drain the fry cooker again for receipt of hot fats from the cooker when desired.

4 Claims, 1 Drawing Sheet

GREASE CADDIE

FIELD OF INVENTION

This invention relates to the handling of cooking oil and grill scrapings, i.e., the screening of solids from the oil and the transportation of oil to a disposal facility. In particular, the present invention provides an apparatus for screening, transporting, and heating of the cooking oil and grill scrapings in an improved manner so as to allow the operation more safety and convenience through particular design features.

BACKGROUND OF THE INVENTION

In recent years the proliferation of convenience or fast food restaurants has driven a growing need to handle, recycle, store, screen, and dispose of fats generated from the fryers in such restaurants in the form of used cooking oil and fats generated by the cooking grills as a byproduct of heating and cooking meats and products containing fat.

Previously, when disposing of oil, a bucket or container was used to collect the oil for transport to a container where it is held for collection by a truck. Such a method exposed the person doing the transport to a risk of burns, and it also allowed spillage onto the floor from the open bucket.

Recently, there have been developed wheeled transport devices for disposing of used cooking oil from the fryers, socalled "grease caddies" of low slung design and having a pivotable top lid openable to expose a screened filter basket. The grease caddie is adapted to the fryer-cookers so that the caddie fits into the space below the hot oil fryer-cooker such that the oil can be drained by gravity from the cooker through the screening basket into a reservoir in the caddie.

In the instance of disposing of the fats generated from the cooking grills, troughs or removable trays are filled with run off fats and particles from the high temperature heating or cooking surface known as the grill. The contents of these trays are periodically dumped into the disposal buckets.

Prior art disposal caddies consisted of carts of various shapes and sizes with wheels designed to roll the cart to a disposal receptacle, whereupon the contents are hand or electrically pumped from the cart into the disposal container.

It is clear that an improved apparatus for handling, screening and, in this case, heating the fats is desirable. Heating of fats held in the disposal cart is needed because at room temperature fats thicken or even solidify, which makes evacuating the contents of the disposal container cumbersome and difficult. Heating capacity in the disposal cart provides greater flexibility and convenience for the operator because the operator can control the temperature of the fat which, in turn, allows the convenience of pumping the hot, liquid fats from the cart at a time most convenient for the operator.

The more recently designed grease caddies included a heater element inserted directly into the tank of the caddie to maintain the contents of the caddie fluid for pumping out into large storage tanks, or if the contents had solidified, to liquify the contents for evacuation.

The problem with these heat devices is that they were implanted into a small area of the caddie tank and the heater would have to be operated at a high enough temperature for the warmth to spread throughout the caddie, thus liquefying the entire contents thereof. Such elevated temperatures, plus the direct contact between the heating element and the grease or oil in the tank caused its own set of problems. On certain occasions, especially when the contents of the tank was low, the grease might smoke or even catch fire due to exposure to too much heat.

While a thermostat could in theory be used in an attempt to control the temperature, having the heating element directly exposed to the grease or oil left much to be desired. After considering the situation noted above, it became clear to the inventor that there was a better way to maintain the grease fluid without adding to the cost or complexity of the caddie (as via a thermostat) and while also eliminating the grease—heating element contact.

SUMMARY OF THE INVENTION

The device of the invention combines a number of elements in such a fashion that the result is a mobile, easy to use and transport cart with capabilities to screen, transport, store, heat, and pump cooking oils and grill fats, while at the same time eliminating the problems of recent caddies. The device combines, in one unit, all of the mechanisms necessary to perform the above-cited functions with existing fryer-cookers commonly used in the food service industry. The principle characteristics of this improved grease caddie will now be described.

STORAGE

The grease caddie is designed to fit under the fryer-cooker cavity so that the hot cooking oil can be gravity fed through the filter screen into the cart body. The overall height is less than 10 inches so that the cart will fit under most fryer-cooker. The lid is designed to lay flat and to expose a screened filter basket as material enters the caddie body under the fryer cooker.

HEAT

The grease caddie is designed with a partial bottom cavity which parallels the horizontal caddie floor. An upstanding filler pipe joins the bottom cavity and is provided for filling the bottom cavity with a water-antifreeze mixture. A pressure valve closes the upstanding pipe. The upstanding pipe and pressure valve insures that the bottom cavity is liquid filled and yet allows pressure for relief of excess pressure. This bottom horizontal space allows provision of an electric heating element submersible in a heat transfer fluid such as a water-antifreeze mixture so that even heat is generated on the caddie bottom which, consequently, allows an even heat distribution which rises throughout the fat contained in the caddie. Thus, the caddie can serve as a collection point for grill fats, as well as a holding vessel for fryer grease, until it is most convenient for the operator to heat the contents to a fluid state and then pump the contents into a storage tank.

The heater as configured allows the re-heating to progress more quickly yet requires less temperature since the heat contact to grease surface area is enlarged.

MOBILITY

The cart is designed to move when full of spent grease and fats so that the contents do not splash out. The side walls of the caddie reservoir are provided with upper edges having an overlap portion along an inside region at a top of the side walls which act as a splash barrier. The front wheels swivel and a removable tall handle provides ease of handling.

In a shortening disposal system the caddie transports spent grease and fats from the fryers and grills to a load-out station which is a holding tank typically located at an outside wall at the rear of a restaurant. This cart is provided with a draw tube so that the fat can be pumped into the load-out tank. Further modification can be made so that, in a particular instance, a pump can be mounted on the caddie so that the hot grease and fats can be removed from the body of the caddie.

SCREENING BASKET

A screening basket is mounted inside the body of the cart, directly under the opening lid. The screening basket provides for the removal of solids from the fryer oil and grill fat and scrapings.

The combination of the above features allows the functions of mobility, heating, screening, and transporting for disposal of cooking oils and grill fats. The features and functions are combined into one device that can be adapted to current fryingcooking technology and provide safety and ease of operation.

OBJECTS OF THE INVENTION

It is therefore an object of the invention to provide a mobile cart suitable for placing under a fryer-cooker for receiving and screening oil for easy disposal of the oil into a waste oil disposal container.

Yet another object is to provide a mobile cart which includes a novel electric heating mechanism for heating solidified oil and grease in the container to a fluid state to allow pumping the oil from the mobile cart to a waste oil disposal container or to any desired location.

Still another object is to provide a mobile cart which is dimensioned to fit under normal commercial cooking facilities for receipt of spent oil and for disposal of the oil.

Another object is to provide a mobile holding container where grill fats can be deposited, screened, and then held until being transported to a holding tank where the fats can be heated for evacuation by pumping into the tank.

Yet another object is to configure the heater such that it resides in a sealed compartment of its own so as to eliminate direct contact with the grease, oil or fat in the caddie.

DETAILED DESCRIPTION OF PREFERRED EMBODIMENT

Figure 1:
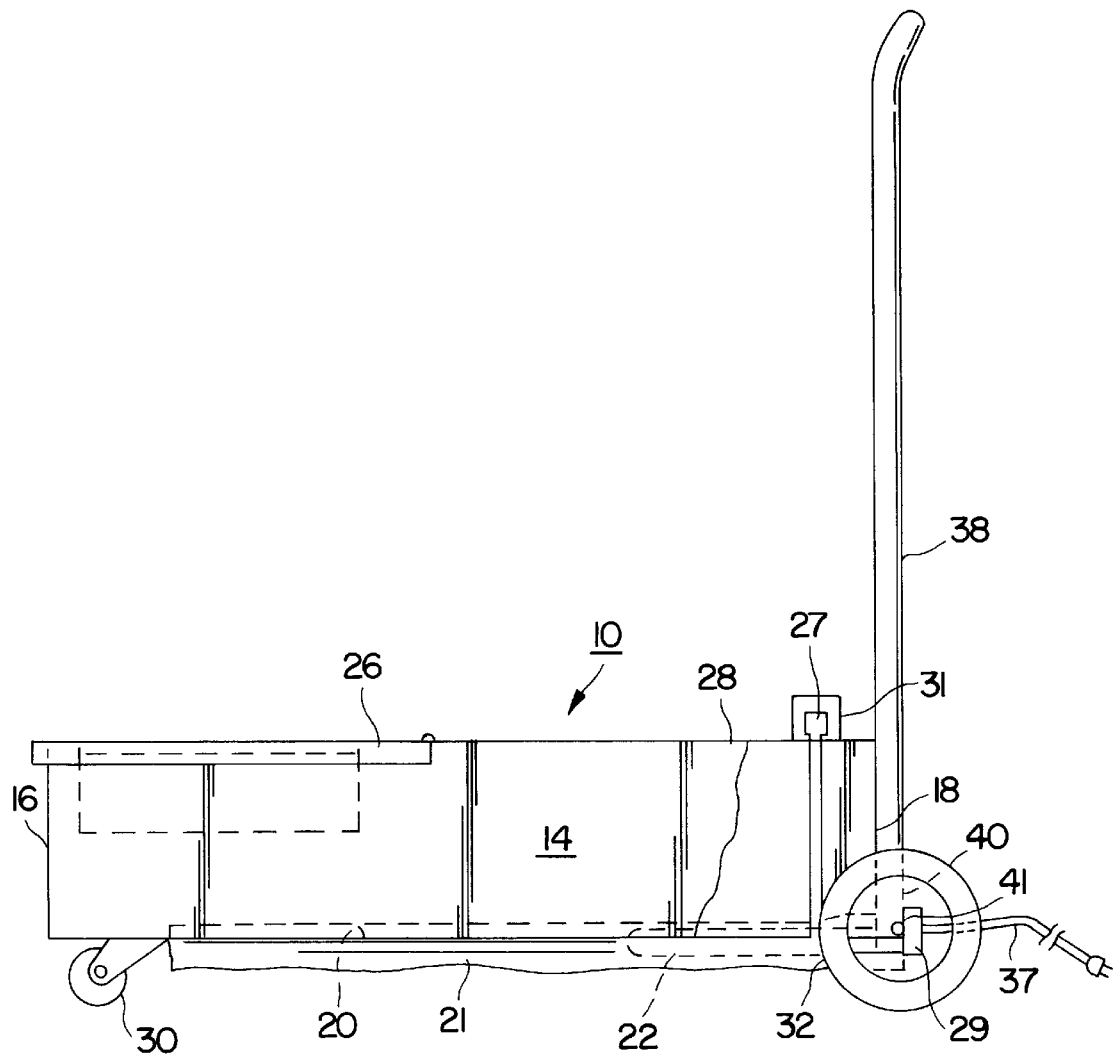
FIG. 1 illustrates a side view of the mobile caddie with the side partially cut away to show other elements.
Figure 2:
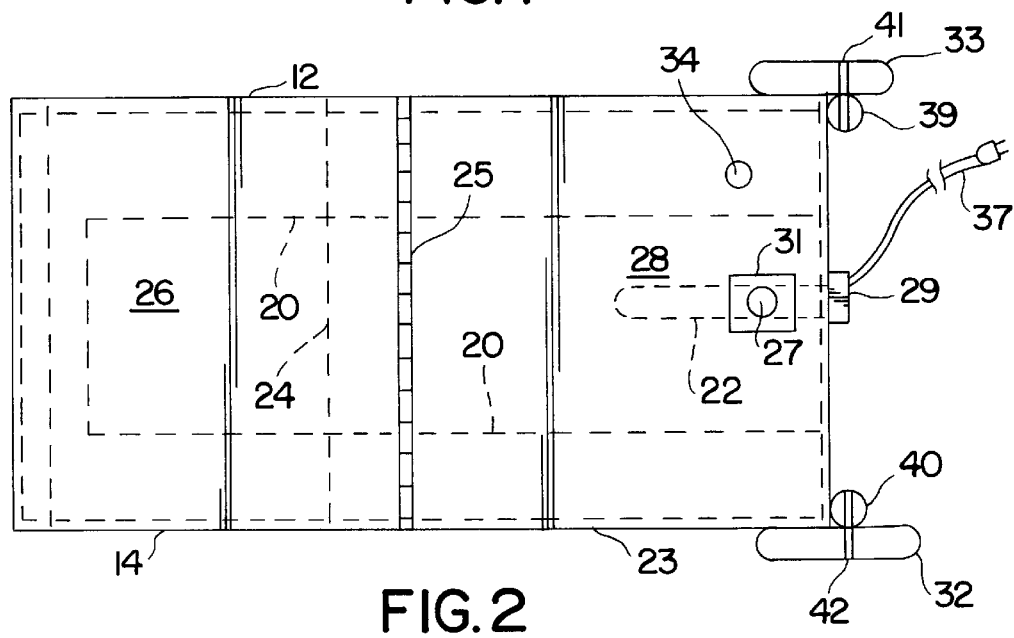
FIG. 2 is a top view of the device shown in FIG. 1.

FIGS. 1 and 2 illustrate different views in which the same elements are represented by like references throughout the drawings. FIG. 1 illustrates a side view of the mobile caddie with one side partially cut away to show inner elements. As shown, the mobile caddie includes a rectangular body 10 which has rectangular sides 12 and 14 with rectangular ends 16 and 18. The rectangular body has a bottom wall 20, a portion of which defines the top of a bottom cavity or reservoir 21 which extends across at least a portion of the bottom wall and toward the front end.

The reservoir is underslung on the caddie bottom wall. The body of the caddie thus forms a large container into which cooking oil and or grill fat may be discharged and maintained to be disposed of later. A container having the following dimensions, 7" deep, 14" wide, and 30' long, will have usable capacity of about 13.0 gallons. The upper surfaces of the sides and ends are provided with an inwardly extending lip or edge 23 which provides a splash barrier while the mobile caddie is being moved when filled with oil.

A coarse filter or strainer 24 that passes grease to the caddie container is also provided for straining any large particles from any fluid that passes through the filter 24. The filter 24 is secured at its upper end over the edges of the sides 12 and 14 and extends into the open area of the caddie from side to side. The filter 24 is formed as a basket which is hung by its ends on the wall of the caddie. The caddie is provided with a front door 26 which can cover the filter or strainer 24 and is secured by a hinge 25. The caddie is provided with a water-antifreeze mixture filler pipe 28 which extends from an upper surface of the bottom cavity through the upper wall of the caddie. A pressure release valve 27 is secured to the upper end of the filter pipe to control the pressure in the bottom cavity. The pressure valve is surrounded by square walls 31 and is removed for adding the water-antifreeze mixture to the bottom cavity and then replaced.

The caddie is also provided with an electric heating element 22 which can be used to heat the oil in the event the oil cools down and is not suitable for pumping with a pump when it is to be disposed. The electric heating element 22 passes through an opening in the rear wall and extends into the bottom cavity or reservoir 21 and is secured to the rear wall of the caddie so that the heating element heats the water-antifreeze mixture, which in turn heats the bottom surface of the caddie which in turn heats the oil. The heating element is provided with an electrical cord 37 for providing electrical power to the heater. The caddie is provided with oppositely disposed front wheels 30 and rear wheels 32, 33 which permits movement of the caddie. The candy is also provided with a tube 34 through which the fluid grease is drawn by a pump, not shown, to remove the grease from the caddie container. A tubular handle 38 that fits into oppositely disposed tubular handle sockets, 39, 40 is secured on the rear end of the caddie. The respective wheels are secured to the handle sockets via the same bolts, 41, 42 used to secure the handle for the sake of economy and efficiency. A suitable pump, suction pipe and pipe fittings are used for carrying out the grease removal operation of the mobile caddie. The mobile caddie can be used in any suitable manner to pump oil from the cooker to the caddie, as well as to pump oil from the candy to an oil disposal tank.

In normal use, the caddie is pushed under a bottom outlet of the cooker with the front door open to expose the strainer filter 24. An outlet opening in the bottom of the cooker can be opened to drain the cooking oil by gravity into the caddie through the stainer filter 24.

If it is desirable to remove the old oil from the caddie, the caddie can be removed from under the cooker and rolled to a place for disposing the spent oil. The heater is activated to heat the oil to a fluid state so that the oil can be pumped from the caddie through the tube or stand pipe 34. Once the old oil has been removed, the basket strainer can be removed and cleaned or replaced if necessary.

The spent oil can be removed from the caddie reservoir via the stand pipe 34 by use of a separate pump and motor, not shown. The pump and motor can be on the inside of a room bounded by an outside wall, or it could even be disposed on the caddie. An outlet hose or pipe connected to the pump can be connected to a pipe connection that passes through the outside wall and which is connected to or extended into an opening of an oil disposal tank or dumpster so that the oil is pumped from the caddie to the disposal tank. The mobile caddie could be rolled outside of the building and the oil pumped from the caddie container into the disposal tank. If necessary, the heating element can be used to reheat the oil to a fluid state before being pumped into the disposal tank if it has become solidified.

It should therefore be clear that the mobile caddie can be used for receiving spent grease into the candy container and then the caddie could be rolled to a clean-out position which includes the motor, pump and appropriate piping to remove the grease and/or oil from the caddie and to pump it into a disposal tank. In this way, the motor and pump would be a separate installation from that of the caddie. The motor and pump could be on the inside of the building and the oil pumped from the caddie to the disposal tank or the motor and pump could be on the outside close to the disposal tank. If necessary, the electric heater could be used to heat the oil before pumping the oil from the mobile caddie. Once the oil has been removed from the mobile caddie, the filter screen is cleaned and replaced and the mobile caddie is returned to its position under the cooker.

The foregoing relates to preferred exemplary embodiments of the invention, it being understood that other variants and embodiments thereof are possible within the spirit and scope of the invention, the latter being defined by the appended claims.

I claim:

1. A grease caddie, said grease caddie including a body for containing cooking oils and grease therein, said grease caddie is provided with wheels of a size which permits said grease caddie to move below a hot-oil-cooking means and which aides in moving said grease caddie from place-to-place, at least one cover which covers at least a portion of said body, at least one filter screen for filtering grease relative to said body, said at least one filter screen adapter to filter food particles from hot cooking oil as the hot cooking oil is transferred from said hot oil cooking means to said grease caddie, said body includes a bottom cavity that forms a reservoir for a heat transfer fluid disposed therein, said reservoir including filler tube means for provision of said heat transfer fluid extending through said body and terminating above said cover, said grease caddie includes a heating element for heating said heat transfer fluid contained in said bottom cavity and in turn to heat the cooking oil in said grease caddie to a fluid state, said heating element inserted into a socket provided in said bottom cavity to heat the heat transfer fluid being which in turn heats the spent oils and grease in said caddie, and a pressure release valve is secured in an inlet end of said filler tube.

2. A grease caddie as set forth in claim 1, in which said body includes a cover which covers said body in an area above said filter screen which provides access to said body.

3. A grease caddie as set forth in claim 1, in which said bottom cavity for heat transfer fluid is defined by at least a portion of a bottom wall of said grease caddie, a parallel lower wall and side walls joining said parallel lower wall to said caddie bottom wall.

4. A grease caddie as set forth in claim 1, in which said grease caddie includes handle means disposed in a pair of sockets mounted rearwardly of said caddie body and respective rear ones of said wheels are mounted to said body through bolts extending through a respective handle socket.

* * * * *